Aug. 16, 1966  E. D. MATTIX ETAL  3,266,427

PUMP IN A RECYCLE TYPE OPERATION

Filed Aug. 26, 1965

INVENTORS
EMORY D. MATTIX
CHARLES W. STOKES
BY
ATTORNEY

3,266,427
PUMP IN A RECYCLE TYPE OPERATION
Emory D. Mattix and Charles W. Stokes, Lake Charles, La., assignors to Cities Service Research and Development Company, New York, N.Y., a corporation of Delaware
Filed Aug. 26, 1965, Ser. No. 482,761
1 Claim. (Cl. 103—97)

This invention relates to a centrifugal pump and more particularly to an improved centrifugal pump whereby the backflow of fluid into a centrifugal pump is inhibited when the pump is inoperative.

The centrifugal pump of the present invention is of conventional construction. The pump has a diffuser section from which ports, i.e., passages, are cut out, to allow liquid to be discharged from the pump. Should the pump become inoperative, or malfunction, when employed in a recycle type operation, fluid, e.g., gas and/or liquid, tends to flow back into the pump resulting in loss of pump suction. A graphic illustration of the problems encountered when using such a centrifugal pump, as described above, may be had by reference to a typical operation wherein recycling of liquid is involved.

The hydrogenation of hydrocarbon oil is conducted in a substantially vertical, elongated reactor. Within the reactor there is contained, among other elements, a conduit for recycling liquid, a distributor plate and below the distributor plate, in the lower portion of the reactor, the aforementioned centrifugal pump, horizontally disposed whereby the impeller thereof rotates about a vertical axis and in communication with the conduit. Gas and liquid are introduced into the lower portion of the reactor by means of an inlet located at the bottom of the reactor. The pump functions as a recycle pump, in that it recycles liquid passing down the conduit, as well as any small amounts of gas that may have passed down the conduit. When the recycle pump is not operating, due either to start-up procedures or mechanical malfunction, the gas, and sometimes the liquid, tends to flow back through the recycle pump in reverse direction and up into the conduit. This results in the liquid which is present in the conduit becoming aerated, causing the liquid to flow in reverse direction up the conduit and through the catalyst material resting on the distributor plate, i.e., reactant bed. This reverse flow forces the catalyst to drop through, and below, the distributor plate, with resultant loss of pump suction due to plugging of the system.

It is an object of this invention to provide an improved centrifugal pump.

It is another object of this invention to provide an improved centrifugal pump whereby the back flow of fluid into a centrifugal pump is inhibited when the pump is inoperative and yet allows fluid to discharge freely when the pump is operative.

It is yet another object of this invention to provide an improved reactor.

These and other objects of this invention will become apparent from the description of the invention which follows, and from the accompanying drawings, which illustrate a preferred embodiment of the invention, and in which.

The present invention may be employed, as will be readily appreciated by one skilled in the art, in many varied and different applications. When the apparatus of the present invention is employed in the hydrogenation of hydrocarbon oil, the reactor 10 as shown in FIG. 1 is preferably a substantially vertical, cylindrical vessel of such wall construction that it will withstand fluid pressures on the order of about 1000 to about 5000 pounds per square inch gauge and temperatures on the order of from about 750° F. to about 1500° F.

For the purpose of hydrogenation of a liquid, a reactant inlet for the hydrogen gas and liquid is provided at 11, such reactant passing through the lower portion of the reactor and mixing with the liquid discharged from the pump 12. The total liquid and gas then passes upwardly through a distributor plate 13.

For hydrogenation purposes, the reactor is usually filled with a contact material which may be from the size of a slurry, i.e. 0–20 microns to particulate solids such as $\frac{1}{32}''$ x $\frac{1}{8}''$ extrudates and to accomplish the desired contact the liquid will flow upwardly through such a bed of contact materials, i.e., reactant bed 14 at a rate of from 20 to 200 gallons per minute per square foot of horizontal cross-section of the reactor. As this flow rate is normally above the expected feed rate, the total flow required is accomplished by recycling more or less of the liquid from the upper part of the reactor back to the bottom of the reactor.

Figure 1:
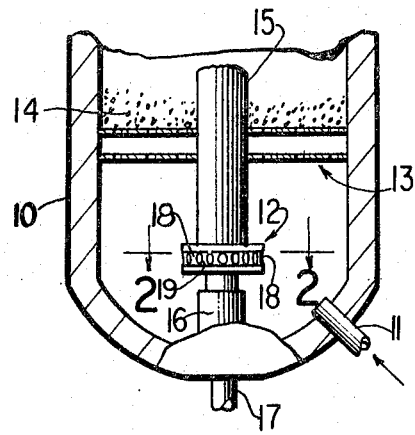
FIGURE 1 is a cross-sectional view of the lower portion of a reactor with parts in elevation, including a centrifugal pump.

Referring to FIG. 1, it can be seen that conduit 15 is employed to effect recycle of the liquid. A minimum of entrained gas or material is carried over into conduit 15 which extends downwardly to below distributor plate 13. The conduit thus serves to supply the pump 12 which is required to accomplish sufficient pressure head on the liquid to cause it to rise through the solids in the reactor and place them in random motion. Pump 12 is driven by motor 16, which is mounted on shaft 17. Motor 16 is hydraulic, but may be gas or electric as well.

Pump 12 includes a diffuser section 18, which is provided with ports 19. Liquid is discharged from ports 19 which are spaced about the periphery of diffuser 18.

Figure 2:
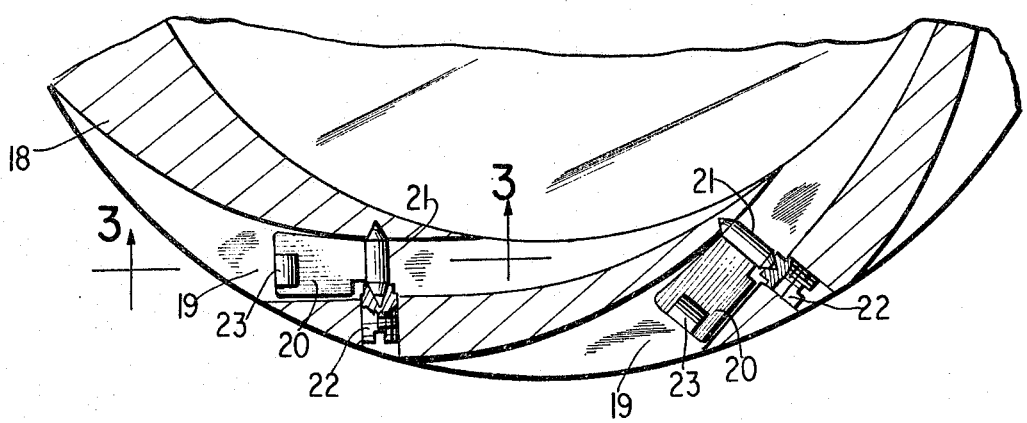
FIGURE 2 is an enlarged cross-sectional view of the diffuser section of the pump taken along the line 2—2 of FIGURE 1.
Figure 3:
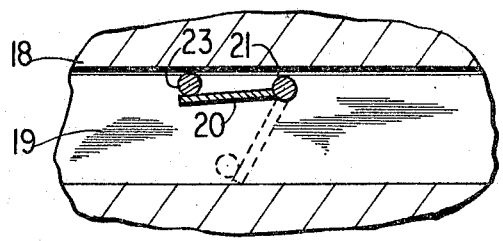
FIGURE 3 is a cross-sectional view taken along the line 3—3 of FIGURE 2.
Figure 4:
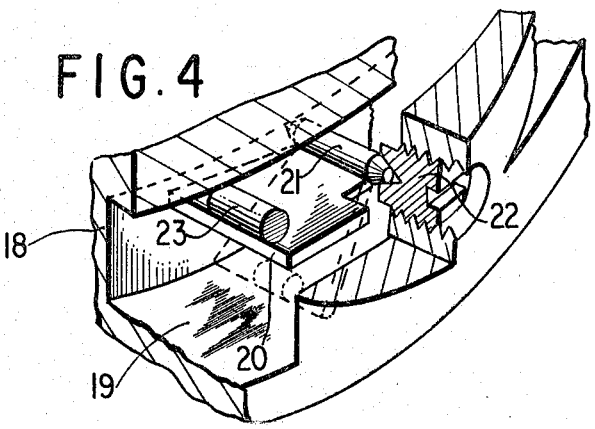
FIGURE 4 is a perspective view of a diffuser port, including means provided by the invention to inhibit the back flow of fluid into the centrifugal pump.

To prevent gas backflow when pump 12 is not operating, ports 19, as shown in FIG. 2, are each provided with check valves 20. The check valves are pivotally mounted in the upper portions of ports 19 on gimbals 21. The gimbals 21 are pivotally mounted in gimbal plugs 22 which are externally threaded and seated in the walls of diffuser 18. The check valves 20 are designed to have a flush fit with respect to the interior walls of the port when pump 12 is inoperative. To insure complete closure of ports 19 when pump 12 is inoperative, rods 23 are welded to the outer surfaces of valves 20 at the lower ends of the valves. The rods 23 thus give added weight to the valves 20. When pump 12 is operating in its normal fashion the liquid which is being discharged from pump 12 strikes the inner surfaces of valves 20 causing them to swing upwardly and outwardly towards the roofs of ports 19. The valves 20 will remain horizontally extended with respect to the roofs of the ports 19 so long as the pump is operative, as shown in FIG. 3. Should the pump cease to operate, the valves 21 will swing downwardly and inwardly as depicted by the dot-dash lines in FIGS. 3 and 4, and thus form a barrier so as to inhibit the back-flow of gas which is being admitted into the reactor via inlet 11.

By inserting check valves in the ports spaced about the periphery of the pump diffuser, gas backflow into the pump is eliminated. Aeration of the liquid within the conduit is prevented and reverse flow of the liquid through the reactor bed is curtailed. Thus, the tendency of the liquid to force reactant material through the distributor plate, when flowing in reverse direction, and into the lower portion of the reactor, with resultant loss of pump suction due to plugging, is effectively eliminated.

As will be readily appreciated by one skilled in the art, the manner and method of mounting the check valves may vary widely. In the preferred embodiment the check valves are pivotally mounted in the upper portions of each port. The check valves may be positioned, with advantage, in the side walls or bottom of each port and actuated by a spring biased mechanism, rather than by gravity, which would prove equally effective in blocking the ports in response to reduction in discharge flow through the ports.

Obviously, many modifications and variations of the present invention are possible in the light of the above teachings. It is, therefore, to be understood within the scope of the appended claim, the invention may be practiced otherwise, than as specifically described.

Therefore, we claim:

A substantially vertical elongated reactor for carrying out liquid phase reactions, said reactor having a vertical internal conduit forming a liquid path within said conduit, a centrifugal pump in the lower central portion of said reactor in communication with said liquid path and adapted to receive a liquid mixture from said path, said pump being horizontally disposed whereby the impeller thereof rotates about a vertical axis, said pump having a diffuser section, a plurality of discharge ports spaced about the periphery of said diffuser and radiating horizontally about the impeller periphery, said ports being adapted to discharge said liquid mixture from said pump, check valves pivotally mounted in an upper portion of each of said ports so as to swing upwardly and outwardly toward the roofs of said ports when said liquid mixture strikes the inner surfaces of said valves upon being discharged from said pump and to swing downwardly to block said ports in response to reduction of discharge flow through said ports, each such check valve having a horizontally extending pivot at the upstream end thereof whereby the pressure fluid forces the trailing end of the valve up to permit discharge and prevents reverse flow on the loss of said pressure fluid.

References Cited by the Examiner

FOREIGN PATENTS

| | | |
|---|---|---|
| 721,384 | 12/1931 | France. |
| 1,062,349 | 12/1963 | France. |
| 357,742 | 10/1931 | Great Britain. |

MARK NEWMAN, *Primary Examiner.*

HENRY F. RADUAZO, *Examiner.*